US005601750A

United States Patent [19]

Domke et al.

[11] Patent Number: 5,601,750

[45] Date of Patent: Feb. 11, 1997

[54] ENZYMATIC BLEACH COMPOSITION

[75] Inventors: Todd Domke, Newtown, Pa.; Charles C. Nunn, Rutherford, N.J.; Marco L. Giuseppin, Schiedam, Netherlands; Rudolf J. Martens, Vlaardingen, Netherlands; Ton Swarthoff, Hellevoetsluis, Netherlands; Cornelis T. Verrips, Maassluis, Netherlands

[73] Assignee: Lever Brothers Company, Division of Conopco, Inc., New York, N.Y.

[21] Appl. No.: 301,860

[22] Filed: Sep. 7, 1994

[30] Foreign Application Priority Data

Sep. 17, 1993 [EP] European Pat. Off. .............. 93202706

[51] Int. Cl.[6] .............................. C09K 3/00; C11D 3/386; C11D 3/395

[52] U.S. Cl. .................................. 252/186.38; 252/186.1; 252/186.33; 510/305

[58] Field of Search ............................ 252/186.33, 186.1, 252/186.21, 186.38, 174.12; 502/160

[56] References Cited

U.S. PATENT DOCUMENTS

| | | | |
|---|---|---|---|
| 5,227,084 | 7/1993 | Martens et al. | 252/95 |
| 5,288,746 | 2/1994 | Pramod | 252/95 |
| 5,314,635 | 5/1994 | Hage et al. | 252/102 |
| 5,356,437 | 10/1994 | Pedersen et al. | 8/401 |
| 5,445,651 | 8/1995 | Thoen et al. | 8/111 |
| 5,451,337 | 9/1995 | Liu et al. | 252/102 |
| 5,474,576 | 12/1995 | Thoen et al. | 8/111 |

FOREIGN PATENT DOCUMENTS

| | | |
|---|---|---|
| 0244920 | 6/1987 | European Pat. Off. . |
| 0369678 | 5/1990 | European Pat. Off. . |
| 0458398 | 11/1991 | European Pat. Off. . |
| 0458397 | 11/1991 | European Pat. Off. . |
| 0549272 | 6/1993 | European Pat. Off. . |
| 0544519 | 6/1993 | European Pat. Off. . |
| WO93/15174 | 8/1993 | WIPO . |

*Primary Examiner*—Richard D. Lovering
*Assistant Examiner*—Joseph D. Anthony
*Attorney, Agent, or Firm*—Milton L. Honig

[57] ABSTRACT

An enzymatic bleach composition is provided comprising an enzymatic hydrogen peroxide-generating system and a bleach catalyst which is a coordination complex comprising manganese (Mn) and/or iron (Fe) ions, and preferably comprising a ligand L which is a macrocyclic organic compound of formula (I):

$$[NR^3-(CR^1(R^2)_u)_t]_s \quad (I)$$

wherein t is an integer form 2 to 3; s is an integer from 3 to 4, u is zero or one; each $R^1$, $R^2$ and $R^3$ are independently selected from H, alkyl, aryl, substituted alkyl, and substituted aryl.

11 Claims, 4 Drawing Sheets

ENZYMATIC BLEACH COMPOSITION

TECHNICAL FIELD

The present invention relates to a bleach composition. More in particular, it relates to an enzymatic bleach composition comprising an enzymatic hydrogen peroxide-generating system, preferably a $C_1$–$C_4$ alkanol oxidase and a $C_1$–$C_4$ alkanol, and a bleach catalyst which is a manganese and/or iron based coordination complex.

BACKGROUND AND PRIOR ART

Enzymatic bleach compositions comprising a hydrogen peroxide-generating system are well known in the art. For instance, GB-A-2 101 167 (Unilever) discloses an enzymatic hydrogen peroxide-generating system comprising a $C_1$–$C_4$ alkanol oxidase and a $C_1$–$C_4$ alkanol. Such enzymatic bleach compositions may be used in detergent compositions for fabric washing, in which they may effectively provide a low-temperature enzymatic bleach system. In the wash liquor, the alkanol oxidase enzyme catalyses the reaction between dissolved oxygen and the alkanol to form an aldehyde and hydrogen peroxide.

In order to obtain a significant bleach effect at low wash temperatures, e.g. at 15°–55° C., hydrogen peroxide must be activated by means of a bleach activator. Today, the most commonly used bleach activator is tetra-acetyl ethylene diamine (TAED), which yields peracetic acid upon reacting with the hydrogen peroxide, the peracetic acid being the actual bleaching agent.

It is essential in using such bleaching detergent compositions that they are essentially free of catalase activity, because catalase efficiently catalyses the decomposition of the hydrogen peroxide formed by the alkanol oxidase enzyme. Therefore, the alkanol oxidase enzyme must be thoroughly purified in order to liberate it from any contaminating catalase activity. As catalase is abundantly present in all naturally occurring micro-organisms serving as a source for alkanol oxidase, this purification process is essential and it must be carried out extensively, which adds to the cost of the bleaching compositions.

The problem of catalase contamination of the alkanol oxidase may be avoided by isolating the enzyme from a catalase-free micro-organism, such as described for example in EP-A-244 920 (Unilever).

However, even when using catalase-free preparations of the alkanol oxidase enzyme, the bleaching performance of such enzymatic bleach compositions, especially in domestic washing machines of the European type, has not been as good as expected. This has been attributed to the forming of acetaldehyde which is formed in stoichiometric amounts with the hydrogen peroxide. The acetaldehyde is believed to react rapidly with any generated peracid to form acetic acid and the carboxylic acid corresponding to the peracid.

In order to overcome this problem, it has been proposed in EP-A-369 678 (Unilever), to incorporate into such enzymatic bleach compositions, a $C_1$–$C_4$ aldehyde oxidase, the $K_m$ of the aldehyde oxidase being lower than that of the alkanol oxidase. It is believed that the aldehyde oxidase enzyme improves the performance of a detergent composition comprising an alkanol, an alkanol oxidase and a bleach activator by preventing the build-up of inhibiting concentrations of aldehyde. Supportive for this idea is the finding that certain chemical compounds which are known to react with aldehydes—such as semicarbazide—are also capable of improving the performance of the known alkanol oxidase based bleaching compositions.

However, enzymes in general are expensive ingredients of a detergent composition, an aldehyde oxidase is no exception. Furthermore, it has proven to be difficult to find an economically acceptable large-scale production system for aldehyde oxidase.

It is therefore an object of the present invention to provide an effective, low temperature bleach composition. It is another object of the invention to provide a bleach composition comprising an enzymatic hydrogen peroxide-generating system, which has good bleaching properties and does not necessarily contain aldehyde oxidase.

It has now surprisingly been found that an effective enzymatic bleach compositions containing an enzymatic hydrogen peroxide-generating system may be obtained by the bleach composition of the present invention, which are characterized in that they further comprise a bleach catalyst in the form of a manganese (Mn) and/or iron (Fe) ions containing coordination complex.

Bleach catalysts in the form of coordination complexes of manganese (Mn) and/or iron (Fe) ions are known in the art, for instance from EP-A-458 397, EP-A-458 398, EP-A-544 519 and EP-A-549 272 (all Unilever). In combination with hydrogen peroxide, they constitute a strong oxidation system.

Because such manganese and/or iron based coordination complexes form a strong oxidation system in combination with the hydrogen peroxide, the man skilled in the art would have expected that a rapid reaction would occur between the hydrogen peroxide and the aldehyde which is formed by the action of the alkanol oxidase on the alkanol. Surprisingly, however, no such reaction occurs and effective bleaching compositions are obtained.

The compositions of the invention comprising a bleach catalyst in the form of a manganese (Mn) and/or iron (Fe) ions containing coordination complex are especially advantegeous in combination with the enzymatic hydrogen peroxide-generating system, because the latter provides the bleach catalyst with a controllable, steady-state level of hydrogen peroxide such that the bleaching action may be kept within predetermined limits. An additional advantegeous feature of the bleaching compositions of the invention is, that at temperatures well over the recommended washing temperature, for instance at 90° C., the enzymatic hydrogen peroxide-generating system is inactivated and the bleaching action automatically ceases.

SUMMARY OF THE INVENTION

In a first aspect, the present invention relates to a bleach composition comprising:

(a) an enzymatic hydrogen peroxide-generating system, and (b) a bleach catalyst which is a manganese and/or iron based coordination complex. Preferably, the bleach catalyst comprises a source of Mn and/or Fe ions and a ligand L which is a macrocyclic organic compound of formula (I):

$$\overline{[NR^3\text{-}(CR^1(R^2)_u)_t]_s} \qquad (I)$$

wherein t is an integer form 2 to 3; s is an integer from 3 to 4, u is zero or one; each $R^1$, $R^2$ and $R^3$ are independently selected from H, alkyl, aryl, substituted alkyl, and substituted aryl.

According to a second aspect, the present invention relates to a detergent composition comprising such a bleach composition.

BRIEF DESCRIPTION OF THE DRAWING

The present invention will be better understood from the following description in conjunction with the accompanying drawing wherein.

Figure 1A:
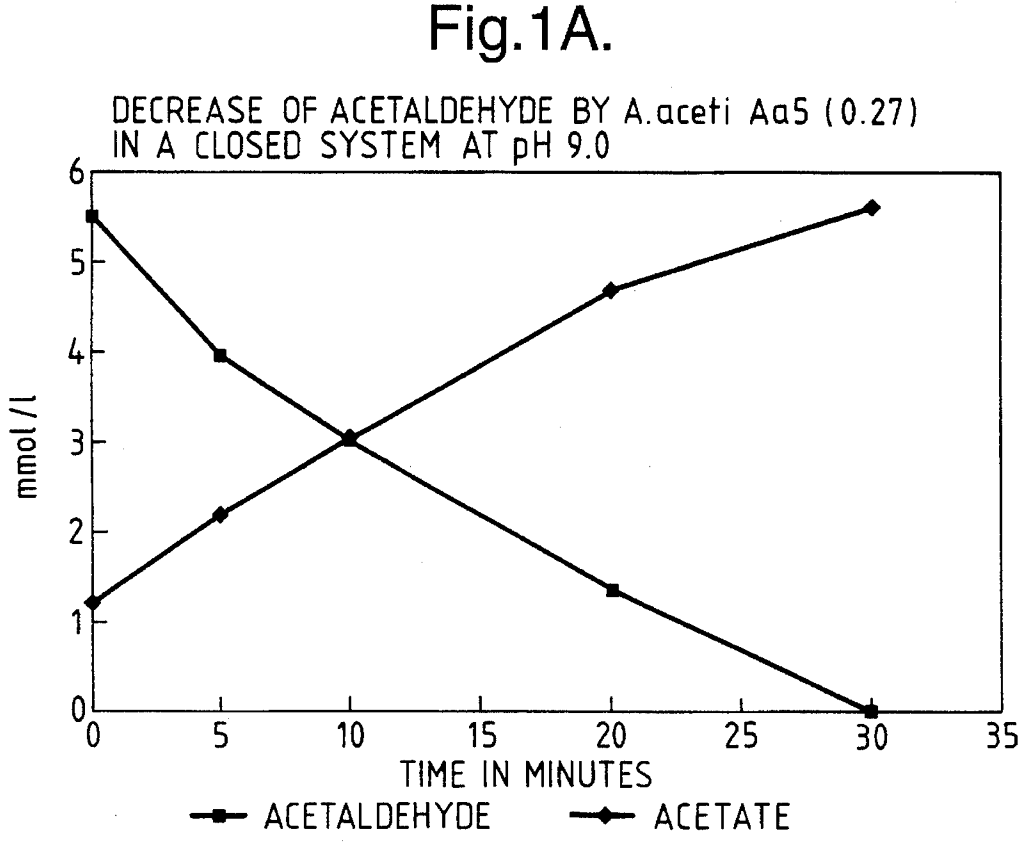
FIG. 1A is a graph showing the decrease of acetaldehyde by A. Aceti Aa5.

DETAILED DESCRIPTION OF THE INVENTION (a) The enzymatic hydrogen peroxide-generating system.

The bleach compositions according to the invention comprise, as a first constituent, an enzymatic hydrogen peroxide-generating system. The enzymatic hydrogen peroxide-generating system may in principle be chosen from the various enzymatic hydrogen peroxide-generating systems which have been disclosed in the art. For example, one may use an amine oxidase and an amine, an amino acid oxidase and an amino acid, cholesterol oxidase and cholesterol, uric acid oxidase and uric acid or a xanthine oxidase with xanthine. Preferably, however, the combination of a $C_1$–$C_4$ alkanol oxidase and a $C_1$–$C_4$ alkanol is used, and especially preferred is the combination of methanol oxidase and ethanol.

Methanol oxidase is preferably isolated from a catalase-negative *Hansenula polymorpha* strain. (see for example EP-A244 920 (Unilever)).

It will be shown in the Examples that, surprisingly, the bleaching performance of a composition containing methanol oxidase in the form of intact yeast cells is superior to that of a composition containing the methanol oxidase in a more or less purified form.

(b) The bleach catalyst.

The second constituent of the bleach compositions according to the invention is a bleach catalyst, which is a manganese (Mn) and/or iron (Fe) based coordination complex.

Preferred bleach catalysts comprise a source of Mn and/or Fe ions and a ligand L which is a macrocyclic organic compound of formula (I):

$$[NR^3-(CR^1(R^2)_u)_t]_s \qquad (I)$$

wherein t is an integer form 2 to 3; s is an integer from 3 to 4, u is zero or one; each $R^1$, $R^2$ and $R^3$ are independently selected from H, alkyl, aryl, substituted alkyl, and substituted aryl.

Examples of more preferred ligands are 1,4,7-triazacyclononane (TACN); 1,4,7-trimethyl-1,4,7-triazacyclononane (1,4,7-$Me_3$TACN); 2-methyl-1,4,7-triazacyclononane (2-MeTACN); 1,2,4,7-tetramethyl-1,4,7-triazacyclononane (1,2,4,7-$Me_4$TACN); 1,2,2,4,7-pentamethyl-1,4,7-triazacyclononane (1,2,2,4,7-$Me_5$TACN); and 1,4,7-trimethyl, 2-benzyl-1,4,7-triazacyclononane; and 1,4,7-trimethyl-2-decyl-1,4,7-triazacyclononane. Especially preferred is 1,4,7-trimethyl-1,4,7-triazacyclononane.

The aforementioned ligands may be synthesised by the methods described in K. Wieghardt et al., Inorganic Chemistry 1982, 21, page 3086 et seq.

Another preferred ligand L comprises two species of formula (II)

$$[NR^4-(CR^1(R^2)_u)_t]_s \qquad (II)$$

wherein t is an integer from 2 to 3; s is an integer from 3 to 4; u is zero or one; each $R^1$ and $R^2$ are independently selected from H, alkyl, aryl, substituted alkyl and substituted aryl; and each $R^4$ is independently selected from hydrogen, alkyl, aryl, substituted alkyl and substituted aryl, with the proviso that at least one bridging unit $R^5$ is formed by one $R^4$ unit from each ligand where $R^5$ is the group $(CR^6R_7)_n$—$(D)_p$—$(CR^6R^7)_m$ where p is zero or one; D is selected from a heteroatom such as oxygen and $NR^8$ or is part of an optionally substituted; aromatic or saturated homonuclear or heteronuclear ring, n is an integer from 1 to 4;

m is an integer from 1 to 4;

with the proviso that n+n≦4;

each $R^6$ and $R^7$ are independently selected from H, $NR^9$ and $OR^{10}$, alkyl, aryl, substituted alkyl and substituted aryl; and each $R^8$, $R^9$, $R^{10}$ are independently selected from H, alkyl, aryl, substituted alkyl and substituted aryl.

An example of a preferred ligand of this type is 1,2-bis (4,7-dimethyl-1,4,7-triaza-1-cyclononyl)ethane, ([EB-$(Me_3TACN)_2$]).

The aforementioned ligands may be synthesised as described by K. Wieghardt et al in Inorganic Chemistry, 1985, 24, page 1230 et seq, and J. Chem. Soc., Chem. Comm., 1987, page 886, or by simple modifications of the synthesises.

The ligand may be in the form of an acid salt, such as the HCl or $H_2SO_4$ salt, for example 1,4,7-$Me_3$TACN hydrochloride. Optionally, a source of iron and/or manganese ions may be added separately as such or in the same particulate product together with the ligand.

The source of iron and manganese ions may be a water-soluble salt, such as iron or manganese nitrate, chloride, sulphate or acetate, or a coordination complex such as manganese acetylacetonate. The source of iron and/or manganese ions should be such that the ions are not too tightly bound, i.e, all those sources from which the ligand as hereinbefore defined, can extract the Fe and/or Mn in the bleaching solution.

Alternatively, the bleach catalyst may be in the form of a mono-, di- or tetranuclear manganese or iron complex. Preferred mononuclear complexes have the general formula (III):

$$[L\ Mn\ X_p]^z\ Y_q \qquad (III)$$

Wherein Mn is manganese in the II, III of IV oxidation state, each X represents a coordinating species independently selected from OR", where R" is a $C_1$–$C_{20}$ radical selected from the group consisting of, optionally substituted, alkyl, cycloalkyl, aryl, benzyl and radical combinations thereof or at least two R" radicals may be connected to one another so as to form a bridging unit between two oxygens that coordinate with the manganese, $Cl^-$ $Br^-$, $I^-$, $F^-$, $NCS^-$, $N_3^-$, $I_3^-$, $NH_3$, $OH^-$, $O_2^{2-}$, $HOO^-$, $H^2O$, SH, $CN^-$, $OCN^-$, $S_4^{2-}$, $R^{12}COO^-$, $R^{12}SO_4^-$, $RSO_3^-$ and $R^{12}COO^-$ where $R^{12}$ is selected from H, alkyl, aryl, substituted alkyl and substituted aryl and $R^{13}COO$ where $R^{13}$ is selected from alkyl and substituted alkyl and substituted aryl;

P is an integer from 1–3;

z denotes the charge of the complex and is an integer which can be positive, zero or negative;

Y is a monovalent or multivalent counter-ion, leading to charge neutrality, the type of which is dependent upon the charge z of the complex;

q=z/[charge Y];

and L is a ligand of formula (I) as hereinbefore defined. These mononuclear complexes are further described in EP-A-544 519 and EP-A-549 272 (both Unilever).

Preferred dinuclear complexes have the formula (IV) or formula (V), see below

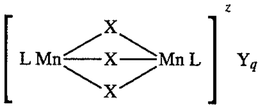

(IV)

In complexes of formula (IV) each Mn is manganese independently in the III of IV oxidation state; each X represents a coordination or bridging species independently selected from the group consisting of $H_2O$, $O_2^{2-}$, $O^{2-}$, $OH^-$, $HOO^-$, $SH^-$, $S^{2-}$, >SO, $Cl^-$, $N_3^-$, $SCN^-$, $NH_2^-$, $NR_3^{12}$, $R^{12}SO_4^-$, $R^{12}SO_3^-$ and $R^{13}COO^-$ where $R^{12}$ is selected from H, alkyl, aryl, substituted alkyl, substituted aryl and $R^{13}COO^-$ where $R^{13}$ is selected from alkyl, aryl, substituted alkyl and substituted aryl; L is a ligand of formula (I) as herein before defined, containing at least three nitrogen atoms which coordinate to the manganese centres; z denotes the charge of the complex and is an integer which can be positive, negative or zero; Y is a monovalent or multivalent counter-ion, leading to charge neutrality, which is dependent upon the charge z of the complex; and q=z/[charge Y].

In dinuclear complexes of formula (V)

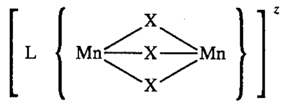

(V)

each Mn is manganese independently in the III or IV oxidation state; each X represents a coordinating or bridging species independently selected from the group consisting of $H_2O$, $O_2^{2-}$, $O^{2-}$, $OH^-$, $HO_2^-$, $SH^-$, $S^{2-}$, >SO, Cl, $N^{3-}$, $SCN^-$, $NH_2^-$, $NR_3^{12}$, $R^{12}SO_4^-$, $R^{12}SO_3^-$, and $R^{13}COO^-$, where $R^{12}$ is selected from H, alkyl, aryl, substituted alkyl, substituted aryl and $R^{13}COO^-$ where $R^{13}$ is selected from alkyl, aryl, substituted alkyl and substituted aryl; L is a ligand comprising two species of formula (II) as herein-before defined, and in which at least three nitrogen atoms of the ligand L are coordinated to each manganese centre;

z denotes the charge of the complex and is an integer which can be positive, negative or zero;

Y is a monovalent or multivalent counter-ion, leading to charge neutrality, which is dependent upon the charge z of the complex; and q=z/[charge Y].

Particularly preferred dinuclear manganese-complexes are those wherein each X is independently selected from $CH_3COO^-$, $O_2^{2-}$, and $O^{2-}$, and most preferably, wherein the manganese is in the IV oxidation state and each X is $O^{2-}$. They include those having the formula:

$[Mn^{IV}_2\ (\mu\text{—}O)_3\ (1,4,7\text{-}Me_3TACN)_2](PF_6)^2$ i)

$[Mn^{IV}_2\ (\mu\text{—}O)_3\ (1,2,4,7\text{-}Me_4TACN)_2](PF_6)_2$ ii)

$[Mn^{III}_2\ (\mu\text{—}O)_3\ (1,4,7\text{-}Me_3TACN)_2](PF_6)_2$ iii)

$[Mn^{III}_2\ (\mu\text{—}O)\ (\mu OAc)_2\ (1,2,4,7\text{-}Me_4TACN)_2](PF_6)_2$ iv)

$[Mn^{IV}_2\ (\mu\text{—}O)_2\ (\mu\text{—}O^2)\ (1,4,7,\text{-}Me_3TACN)_2](PF_6)_2$ v)

$[Mn^{IV}Mn^{III}\ (\mu\text{—}O)_2(\mu\text{—}OAc)\ (EB\text{-}(Me_2TACN)_2)](PF_6)_2$ vi)

and any of these complexes but with other counterions such as $SO_4^{2-}$, $ClO_4^-$ etc.

Other dinuclear complexes of this type, their preparation and their use are described in detail in described in EP-A-458 397 and EP-A-458 398 (both Unilever).

An example of a tetra-nuclear manganese complex is:

$[Mn^{IV}_4(\mu\text{—}O)_6\ (TACN)_4](ClO_4)_4.$

Surprisingly, it was found that the manganese and/or iron based coordination complexes which form a strong oxidation system in combination with the hydrogen peroxide, are not reactive towards the aldehyde which is formed by the action of the alkanol oxidase on the alkanol.

Because the aldehyde is not degraded or removed, it will gradually accumulate as the hydrogen peroxide is formed. Aldehydes, especially acetaldehyde, have an unpleasant smell. Therefore, the enzymatic bleaching system of the invention is preferably equipped with an aldehyde-decomposing system. Obviously, aldehyde oxidase can be used as aldehyde-decomposing system, but this has the disadvantages described above. Other aldehyde-decomposing systems are therefore preferred, and part of this research has been directed at finding suitable aldehyde-decomposing systems.

Acetic acid bacteria are known to grow effectively on ethanol, which is converted via acetaldehyde to acetic acid. The latter conversion is carried out by the enzyme acetaldehyde dehydrogenase (A1DH), which can be NAD(P) dependent (cytoplasmatic) or NAD(P) independent (membrane bound with PQQ as a prosthetic group).

Bakers yeast, *Saccharomyces cerevisiae,* also possesses a NAD(P) dependent acetaldehyde dehydrogenase, which appears to be less active than membrane bound acetaldehyde dehydrogenase.

It was surprisingly found that intact yeast cells are capable of effectively removing acetaldehyde from the bleaching composition. Because yeast cells are commercially available at a low price, this option is particularly attractive. A preferred source of yeast cells is Saccharomyces, especially *Saccharomyces cerevisiae.* The yeast cells are added to the composition in an amount of 0.1% to 20% by weight, preferably of 0.5% to 10% by weight, depending on the activity of the yeast.

The bleach compositions according to the present invention are advantageously used in detergent compositions, which may be in any suitable physical form such as a liquid, powder, granule or tablet. However, due to the necessary presence of the alkanol, the detergent composition is preferably an aqueous or non-aqueous liquid, paste or gel. The bleach system according to the invention is of particular use in non-aqueous liquids. Such non-aqueous liquid detergent compositions are for example described in EP-A-266 199 (Unilever).

In order to prepare a complete fabric washing detergent formulation, the bleach composition is supplemented with the usual components of a detergent composition such as surfactants and builders. Optionally other components can be added, such as proteolytic, amylolytic, cellulolytic or lipolytic enzymes, perfumes and the like.

(c) Bleaching detergent compositions.

The enzymatic bleaching detergent compositions of the invention generally comprise from 0.1–50% by weight of one or more surfactants. Suitable surfactants or detergent-active compounds are soap or non-soap anionics, nonionics, cationics, amphoteric or zwitterionic compounds. The surfactant system usually comprises one or more anionic surfactants and one or more nonionic surfactants. The surfactant system may additionally contain amphoteric or zwitterionic detergent compounds, but this in not normally desired owing to their relatively high cost.

In general, the nonionic and anionic surfactants of the surfactant system may be chosen from the surfactants described "Surface Active Agents" Vol. 1, by Schwartz & Perry, Interscience 1949, Vol. 2 by Schwartz, Perry & Berch, Interscience 1958, in the current edition of "McCutcheon's Emulsifiers and Detergents" published by Manufacturing Confectioners Company or in "Tenside-Taschenbuch", H. Stache, 2nd Edn., Carl Hauser Verlag, 1981.

Suitable nonionic detergent compounds which may be used include, in particular, the reaction products of compounds having a hydrophobic group and a reactive hydrogen atom, for example, aliphatic alcohols, acids, amides or alkyl phenols with alkylene oxides, especially ethylene oxide either alone or with propylene oxide. Specific nonionic detergent compounds are $C_6$–$C_{22}$ alkyl phenol-ethylene oxide condensates, generally 5 to 25 EO, i.e. 5 to 25 units of ethylene oxide per molecule, and the condensation products of aliphatic $C_8$–$C_{18}$ primary or secondary linear or branched alcohols with ethylene oxide, generally 5 to 40 EO.

Suitable anionic detergent compounds which may be used are usually water-soluble alkali metal salts of organic sulphates and sulphonates having alkyl radicals containing from about 8 to about 22 carbon atoms, the term alkyl being used to include the alkyl portion of higher acyl radicals. Examples of suitable synthetic anionic detergent compounds are sodium and potassium alkyl sulphates, especially those obtained by sulphating higher $C_8$–$C_{18}$ alcohols, produced for example from tallow or coconut oil, sodium and potassium alkyl $C_9$–$C_{20}$ benzene sulphonates, particularly sodium linear secondary alkyl $C_{10}$–$C_{15}$ benzene sulphonates; and sodium alkyl glyceryl ether sulphates, especially those ethers of the higher alcohols derived from tallow or coconut oil and synthetic alcohols derived from petroleum. The preferred anionic detergent compounds are sodium $C_{11}$–$C_{15}$ alkyl benzene sulphonates and sodium $C_{12}$–$C_{18}$ alkyl sulphates.

Also applicable are surfactants such as those described in EP-A-328 177 (Unilever), which show resistance to salting-out, the alkyl polyglycoside surfactants described in EP-A-070 074, and alkyl monoglycosides.

Preferred surfactant systems are mixtures of anionic with nonionic detergent active materials, in particular the groups and examples of anionic and nonionic surfactants pointed out in EP-A-346 995 (Unilever). Especially preferred is surfactant system which is a mixture of an alkali metal salt of a $C_{16}$–$C_{18}$ primary alcohol sulphate together with a $C_{12}$–$C_{15}$ primary alcohol 3–7 EO ethoxylate.

The nonionic detergent is preferably present in amounts greater than 10%, e.g. 25–90% by weight of the surfactant system. Anionic surfactants can be present for example in amounts in the range from about 5% to about 40% by weight of the surfactant system.

The enzymatic bleaching detergent composition of the present invention may further contain from 5–60%, preferably from 20–50% by weight of a detergency builder. This detergency builder may be any material capable of reducing the level of free calcium ions in the wash liquor and will preferably provide the composition with other beneficial properties such as the generation of an alkaline pH, the suspension of soil removed from the fabric and the suspension of the fabric-softening clay material.

Examples of detergency builders include precipitating builders such as the alkali metal carbonates, bicarbonates, orthophosphates, sequestering builders such as the alkali metal tripolyphosphates or nitrilo-triacetates, or ion exchange builders such as the amorphous alkali metal aluminosilicates or the zeolites.

It was found to be especially favourable for the enzymatic activity of the detergent compositions of the present invention if they contained a builder material such that the free calcium concentration is reduced to less than 1 mM.

The enzymatic detergent compositions of present invention may also comprise, in further embodiments, other constituents normally used in detergent systems, including additives for detergent compositions. Bleach precursors such as tetra-acetyl ethylene diamine (TAED) should be avoided, however, because any generated peracid reacts rapidly with acetaldehyde to form acetic acid and the carboxylic acid corresponding to the peracid.

The quantity of alkanol oxidase to be employed in compositions according to the invention should be at least sufficient to provide, after dilution or dissolution of the composition with water and interaction with the alkanol, sufficient hydrogen peroxide to bleach standard tea-stained fabric.

The amount of alkanol oxidase will depend on its specific activity and the activity of any residual catalase that may be present, but by way of example it can be stated generally that the detergent composition according to the invention will contain from 10 to 1000, preferably from 20 to 500 units alkanol oxidase per g or ml of the detergent composition, a unit of enzyme activity being defined as the quantity required to convert 1 μmol of substrate per minute under standard conditions. When the composition is then diluted 100 times by addition to water to provide a medium suitable for washing and bleaching fabrics, the medium will contain from 0.1 to 10, preferably from 0.2 to 5 units of enzyme per ml which, on interaction with the alkanol substrate also present, will produce sufficient hydrogen peroxide to bleach standard tea-stained fabric.

Upon dissolution or dilution 100 times by addition of water, the wash medium will usually contain from about 0.1 to 10 g/l, preferably form 0.2 to 5 g/l of detergent composition. The amount of bleach catalyst, the manganese and/or iron based coordination complex, will equally depend on its specific activity and purity. The manganese- or iron content of the detergent composition according to the present invention is normally from about 0.0005% to 0.5% by weight, preferably from about 0.001% to 0.25% by weight.

As a substrate for the alkanol oxidase, the bleach composition of the present invention comprises a $C_1$–$C_4$ alkanol, preferably a primary alkanol. The especially preferred alkanol is ethanol.

The quantity of the alkanol to be employed should be at least sufficient to provide, after dilution of the composition with water and interaction with the alkanol oxidase, sufficient hydrogen peroxide to bleach standard tea-stained fabric. A suitable quantity of alkanol forms from 2 to 25%, preferably 5 to 20% and most preferably 5 to 12% by weight of the composition.

The amounts of alkanol oxidase, manganese-based coordination complex and alkanol in the composition, which is sufficient on dilution of the composition with water to bleach standard tea-stained fabric, should be such that, when the composition is diluted with 100 times its weight of water, the enzyme and substrate will react, at a temperature of 40° C. and a pH of 9, to yield hydrogen peroxide at a concentration of at least 2 mM. Preferably, the alkanol oxidase, manganese-based coordination complex and the alkanol are present in sufficient quantity to yield under these conditions hydrogen peroxide at a concentration of at least 5 mM, most preferably 20 mM or even higher.

The invention will be further illustrated by means of the following non-limiting Examples.

EXAMPLES 1–4

Model bleach experiments were carried out at 40° C. isothermally for 30 min in demineralised water at pH 10.5 in a glass vessel, equipped with a temperature controlled heating spiral in quartz, magnetic stirrer, thermocouple, pH electrode and an efficient cooler (cold "finger" filled with solid carbon dioxide and ethanol, which formed the connection with the outside air). This efficient cooler prevented escape of acetaldehyde from the system. In all experiments 4.1 mmol/l sodium peroxyborate monohydrate (0.410 g/l corresponding with 8.2% on a detergent formulation dosed at 5 g/l) was employed together with the catalyst dosed as a solution in demineralised water; final concentration 2.5 μmol/l. In two experiments (number 2 and 4, see table below) acetaldehyde was added as an aqueous solution; final concentration 4.1 mmol/l. In two other experiments (number 3 and 4) a spay-dried detergent base (i.e. containing all normally applied detergents ingredients except enzymes, the bleaching system and perfume) was used, dosed at 5 g/l. The detergent base had the following formulation (in parts):

| | |
|---|---|
| Alkyl Benzene Sulphonate | 6.3 |
| $C_{13}$–$C_{15}$ 7EO Nonionic | 3.1 |
| Fatty acid (Pristerene 4934) | 1.4 |
| NaOH | 1.3 |
| Zeolite | 26.7 |
| Acrylic/maleic copolymer (Sokalan CP7) | 4.0 |
| Sodium carbonate | 10.3 |
| Sodium sulphate | 0.1 |
| Sodium silicate | 0.4 |
| Sodium Carboxy Methyl Cellulose | 0.6 |
| Fluorescers | 0.2 |
| Water and minors | 11.9 |

The following ingredients were post-dosed or sprayed-on:

| | |
|---|---|
| Sodium carbonate | 2.6 |
| $C_{13}$–$C_{15}$ 3EO Nonionic | 6.7 |
| Antifoam | 1.2 |

The bleaching performance was monitored on standard tea-stained cotton test cloths (BC-1 ex CFT, Vlaardingen, The Netherlands). Two pieces of BC-1 were used in an experiment. After the bleaching period the testcloths were rinsed with tap water and dried in a tumble dryer. The reflectance at 460 nm (R460*) was measured on a Macbeth 1500/Plus colour measurement system, ex Macbeth, before and after the bleach experiments. The difference (ΔR460*) in the values gives a measure of the effectiveness of the bleaching. The results presented below in Table 1 are an average value for the two test cloths.

TABLE 1

| | Example | | | |
|---|---|---|---|---|
| | 1 | 2 | 3 | 4 |
| Detergent Formulation | – | – | + | + |
| Acetaldehyde | – | + | – | + |
| ΔR460* on BC-1 | 24.0 | 24.3 | 30.7 | 29.8 |

Because—within experimental error—the same bleaching results without and with acetaldehyde, it can be concluded from these experiments that acetaldehyde does not interfere with the catalysed perborate bleaching system neither in the absence nor in the presence of a detergent formulation.

EXAMPLE 5

Screening of acetic acid bacteria and yeasts for aldehyde-decomposing activity

In the screening eight acetic acid bacteria were investigated, as well as two yeast strains (one *Hansenula polymorpha* strain and one *Saccharomyces cerevisiae* strain). The acetic acid bacteria were obtained from ATCC (United States) or NCDO (United Kingdom) as mentioned in Table 2. These strains were maintained on Luria Broth agar. The yeasts used in this experiment were *Hansenula polymorpha* CBS 4732 and *Saccharomyces cerevisiae* SU32 from QUEST Menstrie (UK). The yeasts were maintained on YPD-agar. A summary is given below in Table 2.

TABLE 2

| No. | Organism/Code | Medium/Temp. | DW | μmol/min * gX |
|---|---|---|---|---|
| *Acetobacter pasteurianus* | | | | |
| 1. | ATCC 33445 | MED1/26 | 16.4 | 28.2 |
| 2. | ATCC 7839 | MED1/26 | 16.2 | 19.9 |
| *Acetobacter acetii* | | | | |
| 3. | ATCC 15973 | MED1/26 | 15.6 | 81.4 |
| 4. | ATCC 23746 | MED1/26 | 15.6 | 57.0 |
| *Acinetobacter calcoaceticus* | | | | |
| 5. | ATCC 14375 | MED3/26 | 24.3 | 0.0 |
| 6. | ATCC 23055 | MED3/30 | 20.6 | 0.0 |
| 7. | NCDO 791 | MED3/26 | 21.4 | 0.0 |
| 8. | NCDO 709 | MED3/26 | 26.7 | 0.0 |
| Yeast | | | | |
| 9. | *H. polymorpha* A16 | YPD/30 | 29.8 | 2.4 |
| 10. | *S. cerevisiae* SU32 | YPD/30 | 29.9 | 21.0 |

The used media were as follows:
MED 1: 5 g/l Yeast extract, 3 g/l Peptone, 25 g/l glucose · 1 aq
MED 2: 13 g/l Nutrient broth (ex Oxoid).
MED 3: 10 g/l Nutrient broth (ex Oxoid).
YPD: 10 g/l Yeast extract, 20 g/l Peptone, 10 g/l glucose · 1 aq.
KPB: potassium-bi-phosphate buffer pH 7.0.
YKPB-OH: 20 g/l Yeast extract, 0.1M KPB, 30 g/l Ethanol.

The acetaldehyde dehydrogenase (A1DH) activity was determined by measuring the oxygen uptake in a biological oxygen monitor (BOM, model 5300, Yellow Springs Instruments). In the BOM 0.1 ml of the washed cells was added to 5 ml 0.1M KPB (approx. OD 610 nm=0.4). After 1 minute of aeration 0.125 ml 0.2M acetaldehyde was added (final concentration 5 mM) and the decrease in oxygen concentration was recorded. The rate of oxygen consumption is equal to the A1DH activity. These rates corresponded well with acetaldehyde determinations using HPLC methods. The results are given in Table 2.

The four strains from the species *Acinetobacter calcoaceticus* showed no A1DH activity at all under these conditions. From the remaining organisms two acetic acid bacteria with the highest A1DH activity are: *Acetobacter acetii* ATCC 15973 (Aa5), *Acetobacter acetii* ATCC 23764 (Aa6). Although *S. cerevisiae* SU32 has a lower A1DH activity than *A. pasteurianus,* it was investigated further.

EXAMPLE 6

Acetaldehyde dehydrogenase activity at pH 7 and pH 9 in an open system

On the basis of the results of Example 5, three organisms (i.e. Aa5, Aa6 and SU32) were selected for further investigation at higher pH, which is desirable for detergent applications. Also the formation of acetate from acetaldehyde was determined.

The three strains were inoculated from a agar-slope into YPD. After 48 hours 10 ml was transferred to 100 ml YKPB-OH in a 300 ml shake-flask. From these cultures the A1DH activity was measured in KPB pH 7.0 and KPB pH 9.0. The results are listed in Table 3.

TABLE 3

Acetaldehyde dehydrogenase activity at pH 6 and pH 9

| | | pH 6.0 | | pH 9.0 | |
|---|---|---|---|---|---|
| Strain | OD in YKP-OH | OD in BOM | delta O2% %/ min · OD | OD in BOM | delta O2% %/ min · OD |
| Aa5 | 0.125 | 0.040 | 240 | 0.049 | 224 |
| Aa6 | 0.167 | 0.052 | 140 | 0.062 | 161 |
| SU32 | 4.42 | 0.182 | 20 | 0.186 | 23 |

From the results it is clear that the A1DH activity at pH 9.0 is not significantly lower than at pH 6.0. In a washing experiment, approximately 5–8 mM acetaldehyde will be formed in 30 minutes. Some tests were done to show the potential to convert these levels of acetaldehyde into acetate in 30 minutes. The whole cells were suspended in KPB (pH 7 and 9) with 5 mM acetaldehyde and kept at 30° C.

Continuous aeration will be necessary to supply the required oxygen. Samples were taken at intervals and immediately filtered through a 0.45 μm Millipore filter for HPLC analysis.

Aeration causes extra evaporation of acetaldehyde, by determining this loss a small correction for evaporation was made. Experiments in closed bottles showed similar results.

EXAMPLE 7

Conversion of acetaldehyde by *A. acetii* Aa5 and *S. cerevisiae* SU32 in a closed system.

To gain more insight in the way the acetaldehyde is converted by the organisms, the conversion was performed in a closed system. A 100 ml serum bottle with a pierceable cap was filled with 40 ml of KPB pH 9.0.

Figure 1B:
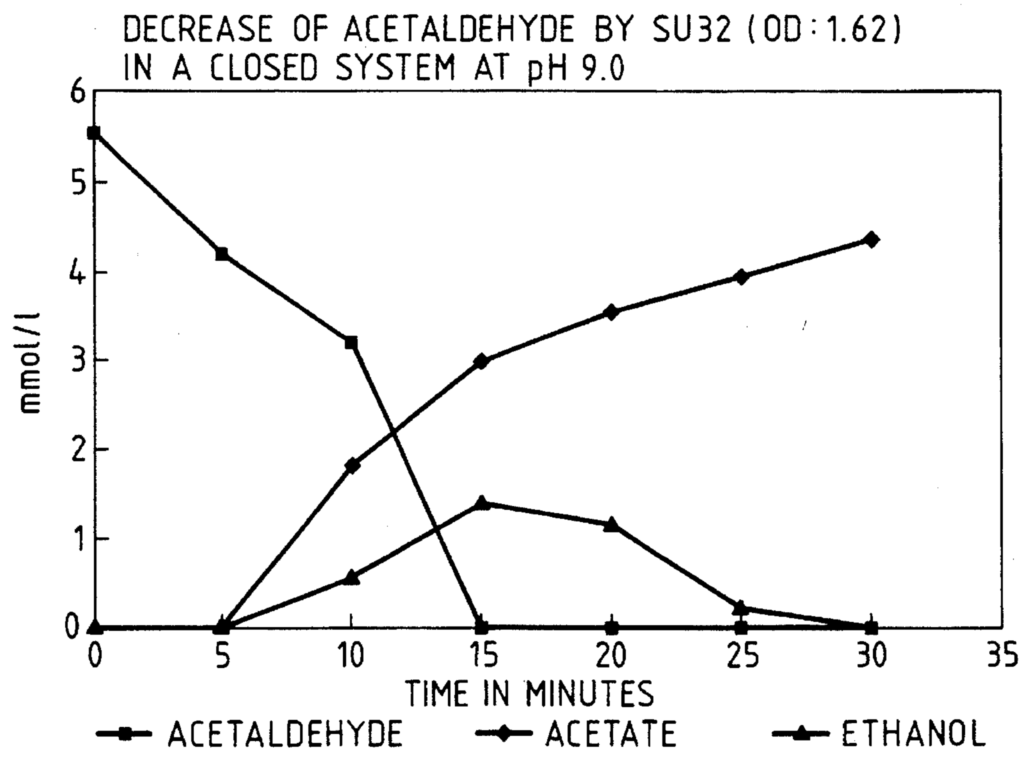
FIG. 1B is a graph showing the decrease of acetaldehyde by SU32.

To increase the A1DH activity, the organisms were grown as described in Example 6. The cells were centrifuged and washed for three times. After determining the A1DH activity using the BOM, the amount of cells necessary for converting all the acetaldehyde within the 30 min. was estimated. Every five minutes a sample was taken and analyzed. The results are shown in FIGS. 1*a* and 1*b*.

EXAMPLE 8

Formation and removal of acetaldehyde in the hydrogenperoxide producing system (MOX-Ethanol) in combination with *A. acetii.*

Two experiments were carried out to investigated whether the acetaldehyde produced in a closed bottle by *Hansenula polymorpha* could be removed by the selected *A. acetii.* In a first experiment freeze dried *H. polymorpha* (about 600 Units/g) containing the methanol oxidase enzyme was resuspended (57 g/l) in KP-buffer pH 7.0. To a 100 ml serum bottle containing 18 ml of KPB pH 9.0 was added a 1/10 volume (2 ml) of the *H. polymorpha* suspension. After addition of 0.25 ml of ethanol (diluted 1:10 with demiwater) samples were taken regularly. By means of HPLC analysis and the hydrogen peroxide assay the course of several products was followed.

The second experiment was carried out as described above except for addition of 100 μl *A. acetii* which is equal to an OD at 610 nm=0.27.

Figure 2A:
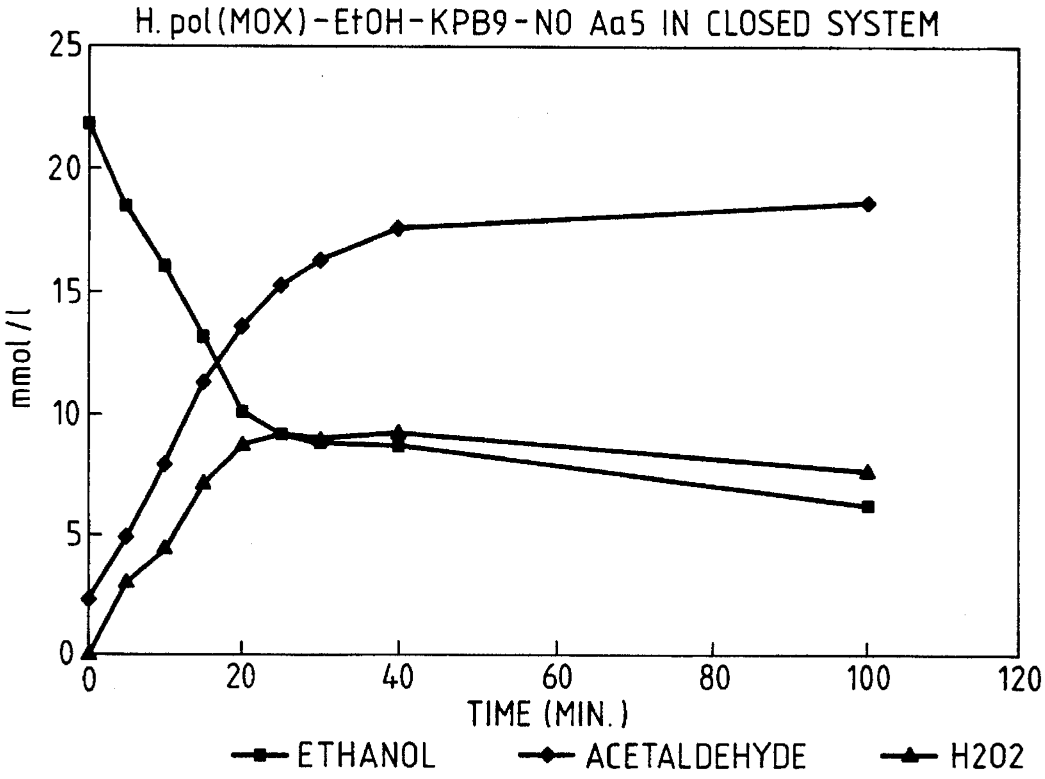
FIG. 2A is a graph showing H.pol(MOX)-EtOH-KPB9-no Aa5 in a closed system.
Figure 2B:
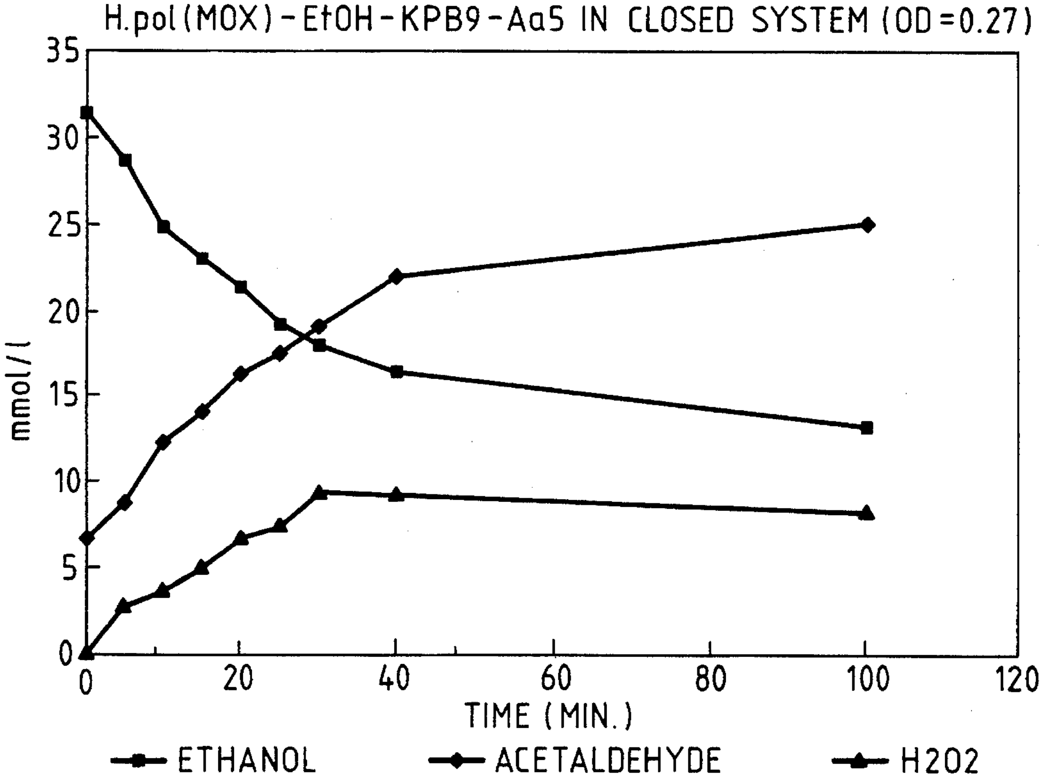
FIG. 2B is a graph showing H.pol(MOX)-EtOH-KPB9-Aa5 in a closed system.

The results of these two experiments are shown in FIGS. 2*a* and 2*b*. There was expected a significant decrease in the acetaldehyde concentration. From the figures it can be seen that no acetaldehyde is converted. Another possibility is that *A. acetii* itself also converts ethanol in acetaldehyde, which results in no decrease but increase of acetaldehyde level. This is also seen in a higher ethanol conversion with *A. acetii.* The $H_2O_2$ production remains the same.

This phenomenon was not investigated in detail, the research concentrated on *S. cerevisiae* instead, which did not produce acetaldehyde from ethanol under these conditions.

EXAMPLE 9

Formation and removal of acetaldehyde in the hydrogenperoxide producing system (MOX-Ethanol) in combination with *S. cerevisiae.*

The experiment as described in Example 8 was performed with *S. cerevisiae* SU32 instead of *A. acetii.* It was calculated that a cell suspension with an OD=0.8 would be sufficient to get significant decrease of produced acetaldehyde. The results of the two experiments are showed in FIGS. 3A and 3B.

Figure 3A:
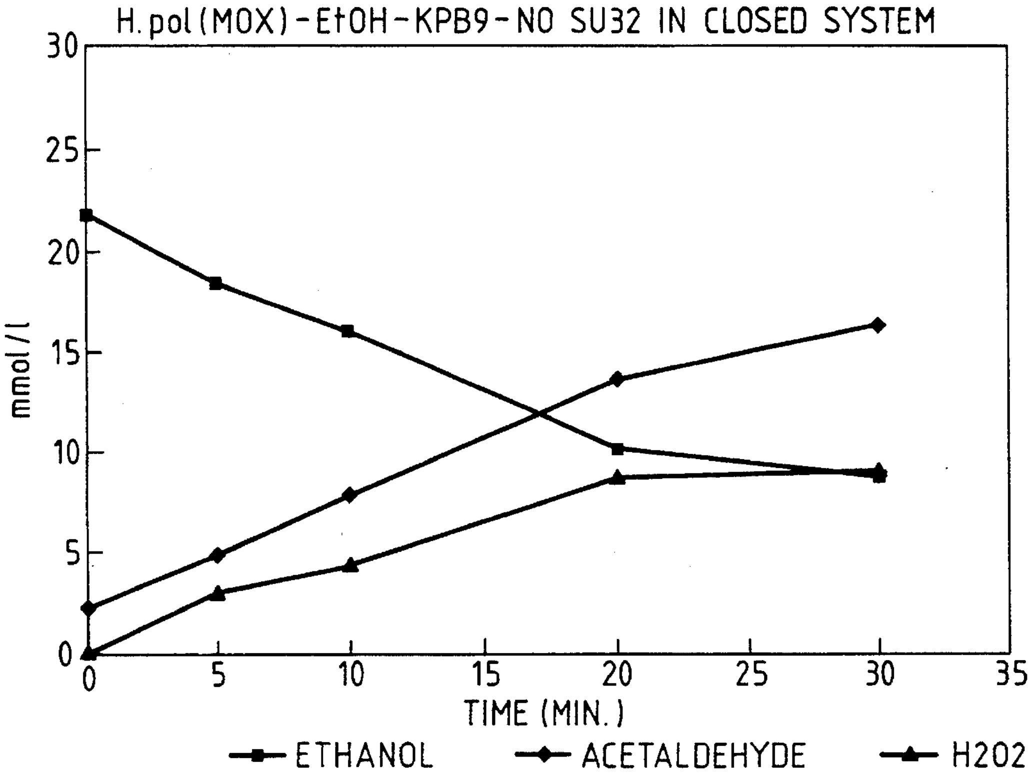
FIG. 3A is a graph showing H.pol(MOX)-EtOH-KPB9-no SU32 in a closed system.
Figure 3B:
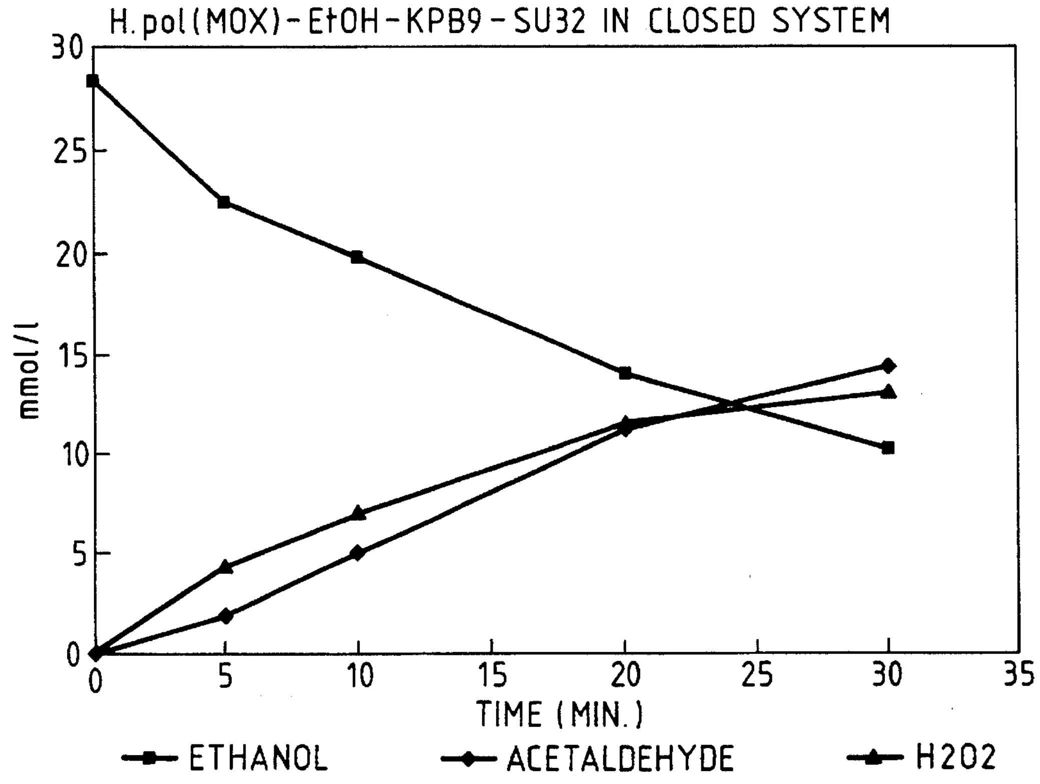
FIG. 3B is a graph showing H.pol(MOX)-EtOH-KPB9-SU32 in a closed system.

From FIG. 3A it is clear that 13 mM ethanol is molarly converted into acetaldehyde. During the conversion 9 mM hydrogen peroxide was produced. The $H_2O_2$-assay was not executed immediately, therefore 9 mM was found in stead of the expected 13 mM. In the experiment shown in FIG. 3B, 18 mM ethanol was converted, this would yield 18 mM acetaldehyde. Since only 14 mM was recovered, 4 mM were converted into acetate by *S. cerevisiae* SU32. From the 18 mM $H_2O_2$ expected, 13 mM was detected.

In dosage of SU32 was increased 5 times to reduce the acetaldehyde level to almost zero at 30 minutes.

EXAMPLE 10

Bleach effect using a Manganese bleach catalyst in combination with MOX-Ethanol.

The bleaching effect of the combination of methanol oxidase and a manganese based coordination complex was tested as follows:

The following stock solutions were used:

172 mM sodium perborate (96.7%, 117.86 g/mol)

0.2 mM bleach catalyst having the formula:

$$[Mn^{IV}{}_2(\mu\text{—}O)_3\ (1,4,7\text{-}Me_3TACN)_2](PF_6)_2$$

57.0 g/l freeze-dried whole cells catalase negative *Hansenula polymorpha*

1.77M ethanol in water;

detergent solution containing per liter: 3.65 g of the detergent composition used in Examples 1–4, 0.06 g antifoam and 0.128 g sodium carbonate.

The following solutions were prepared in closed 100 ml bottles containing BC1 testcloths (in ml):

| Detergent | Perborate | Catalyst | *H. polymorpha* | Ethanol | Water |
|---|---|---|---|---|---|
| 37.5 | 2.0 | 0.5 | — | — | — |
| 37.5 | — | 0.5 | 1.3 | 0.5 | — |
| 37.5 | — | 0.5 | — | — | 2.0 |

Figure 4:
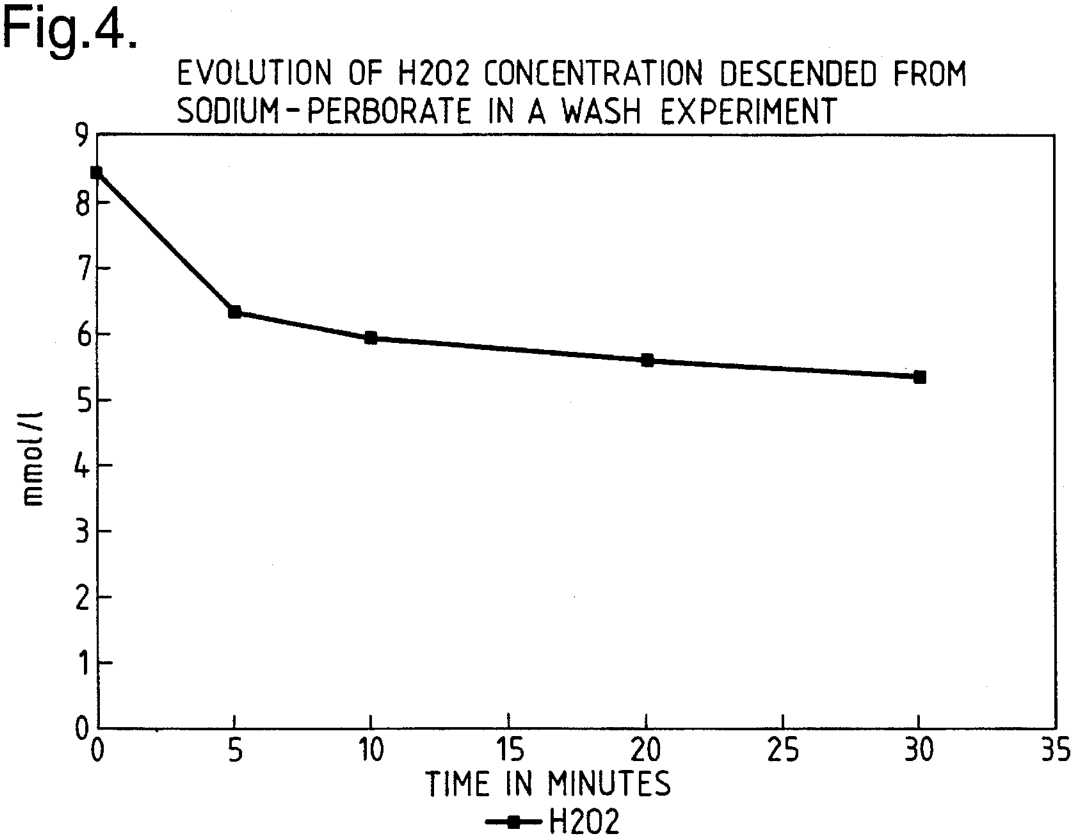
FIG. 4 is a graph showing evolution of $H_2O_2$ concentration descended from sodium-perborate in a wash experiment.

The reaction mixtures were incubated for 30 minutes and at pH 10.5 at 40° C. in closed 100 ml bottles, shaken at 300 rpm. Then the BC1 testcloths were washed for 10 minutes and dried for 15 minutes. The perborate reference generated 8.4 mM $H_2O_2$ quickly. This slowly decreased to 5.7 mM. The MOX system generated rapidly 5 mM $H_2O_2$ with a slow decrease to 2 mM. The bleaching performance of the combination of MOX and the manganese based bleach catalyst was high (delta reflection at 460 nm of 21.4) compared with the perborate (delta reflection 26.7). The control gave a delta reflection value at 460 nm of 4.8. The $H_2O_2$ level of the perborate containing solution was initially high (8.4 mM), as shown in FIG. 4.

EXAMPLE 11

Bleach effect using the Manganese bleach catalyst in combination with MOX-Ethanol and *Saccharomyces cerevisiae*

Figure 5:
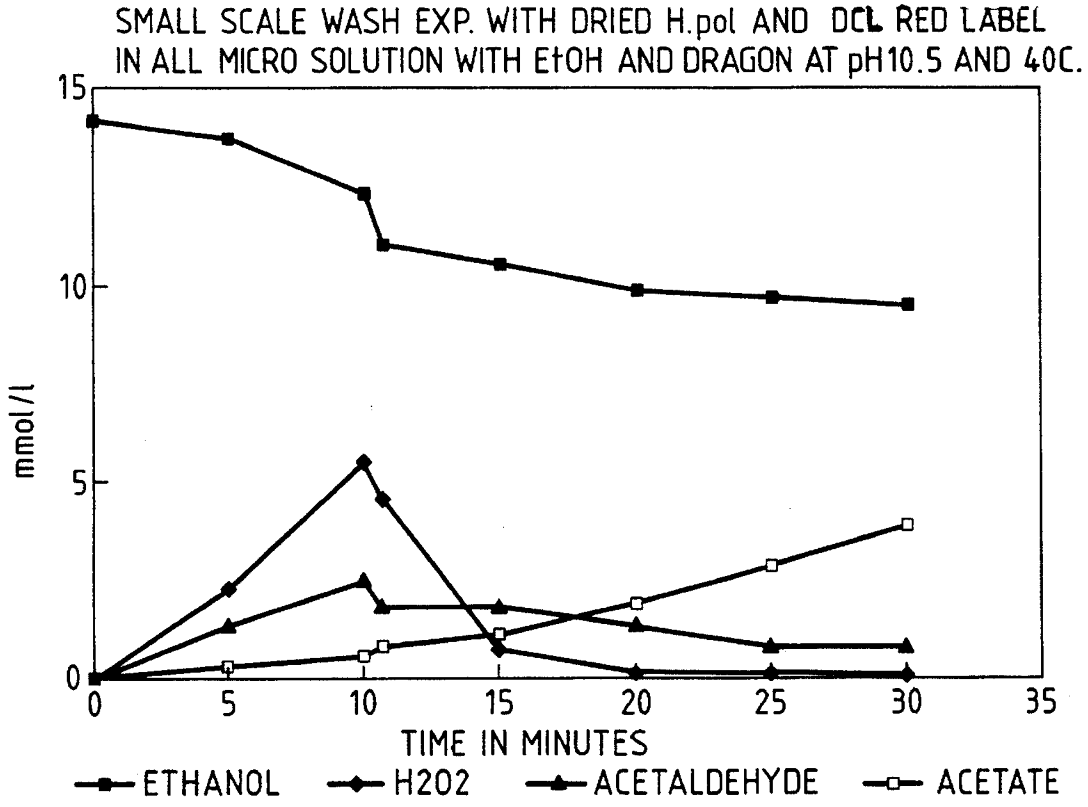
FIG. 5 is a graph showing a small scale wash experiment with dried H.pol and DCL red label in All micro solution with EtOH and Dragon at pill0.5 and 40° C.

Example 10 was repeated, preparing a solution containing 0.15 g freeze-dried whole cells of catalase negative *Hansenula polymorpha* in 39 ml detergent solution to which was added 0.5 ml ethanol solution and 0.5 ml bleach catalyst. The reaction mixture was incubated for 30 minutes and at pH 10.5 at 40° C. in closed bottles, shaken at 200 rpm. After 10 minutes, 0.25 g of dry bakers yeast (*Saccharomyces cerevisiae,* DCL Red label) was added. The effect of catalase present in bakers yeast was circumvented by adding the suspension of bakers yeast cells after 10 minutes. In FIG. 5 the sharp decrease in $H_2O_2$ can be seen. The consumption of acetaldehyde is obtained within 30 minutes below the smell-threshold. The bleach results on BC1 test cloths are given in Table 4. It can be seen that the delta reflection of 14.2 is already high, and it is expected to be even higher if the catalase activity can be diminished.

Both organisms are interesting to investigate in a system where the hydrogen peroxide and acetaldehyde is produced by *H. polymmrpha.* The organism *A. acetii* showed the more than 5 times higher acetaldehyde consumption rate. However, in solutions with ethanol *A. acetii* preferently consumes the ethanol and produces more acetaldehyde. In contrast, the yeast consumes the acetaldehyde.

TABLE 4

| Mn-Bleach catalyst | per borate | *S. cerevisiae* $cat^+$ | MOX/dry *H. polymorpha* $cat^-$ | Detergent | ethanol | Bleach effect Delta R 460 nm on BC1 |
|---|---|---|---|---|---|---|
| X | X | | | X | | 26.7 |
| X | | | X | X | X | 21.0 |
| X | | X | X | X | X | 14.2 |
| X | | | | X | | 4.8 |

EXAMPLE 12

Bleach effect using the Manganese bleach catalyst in combination with purified MOX-Ethanol and Hansenula-Ethanol Example 11 was repeated using Methanol Oxidase ex *Hansenula polymorpha* which had been partially purified by means of ammonium sulphate precipitation, and Methanol Oxidase in the form of freeze-dried *Hansenula polymorpha* cells. The Methanol Oxidase activity was in both cases the same. The bleaching results on BC1 test cloths are given in Table 5.

TABLE 5

| Mn-Bleach catalyst | per borate | purified MOX | MOX/dry *H. polymorpha* cat⁻ | Detergent | ethanol | Bleach effect Delta R 460 nm on BC1 |
|---|---|---|---|---|---|---|
| X | X | | | X | | 24.6 |
| X | | | X | X | X | 16.9 |
| X | | X | | X | X | 10.6 |
| | | | X | X | X | 2.4 |

It can be seen from Table 5 that the best bleaching results were obtained when the methanol oxidase activity was added in the form of freeze-dried *Hansenula polymorpha* cells.

We claim:

1. Bleach composition comprising:

(a) an effective amount of an enzymatic hydrogen peroxide-generating system to generate hydrogen peroxide;

(b) an effective amount of a bleach catalyst sufficient to interact with the hydrogen peroxide and which is a coördination complex comprising manganese or iron ions;

(c) an effective amount of an enzymatic aldehyde decomposing system which comprises intact yeast cells to remove any unpleasant aldehyde smell.

2. Bleach composition comprising:

(a) an effective amount of an enzymatic hydrogen peroxide-generating system to generate hydrogen peroxide;

(b) an effective amount of a bleach catalyst sufficient to interact with the hydrogen peroxide and which is a coordination complex comprising ions selected from the group consisting of manganese and iron complexed with a ligand L which is a macrocyclic organic compound of formula (I):

$$[NR^3-(CR^1(R^2)_u)_t]_s \quad (I)$$

wherein t is an integer from 2 to 3; s is an integer from 3 to 4; u is zero or one; each $R^1$, $R^2$ and $R^3$ are independently selected from the group consisting of H, alkyl, aryl, substituted alkyl and substituted aryl; and (c) an effective amount of an enzymatic aldehyde decomposing system which comprises intact yeast cells to remove any unpleasant aldehyde smell.

3. Bleach composition according to claim 2, wherein the bleach catalyst is a coordination complex based on manganese (Mn) ions.

4. Bleach composition according to claim 2, wherein the bleach catalyst is a coordination complex having the formula: $[Mn^{IV}_2(\mu-O)_3(1,4,7-Me_3TACN)_2](PF_6)_2$.

5. Bleach composition according to claim 2, wherein the enzymatic hydrogen peroxide-generating system comprises a $C_1$–$C_4$ alkanol oxidase and a $C_1$–$C_4$ alkanol.

6. Bleach composition according to claim 2, wherein the enzymatic hydrogen peroxide-generating system comprises methanol oxidase and ethanol.

7. Bleach composition according to claim 2, wherein the enzymatic hydrogen peroxide-generating system is present in the form of intact yeast cells.

8. Bleach composition according to claim 2, wherein the intact yeast cells are *Saccharomyces cerevisiae*.

9. Bleach composition according to claim 2, wherein the ligand L is selected from the group consisting of 1,4,7-triazacyclononane; 1,4,7-trimethyl-1,4,7-triazacyclononane; 2-methyl-1,4,7-triazacyclononane; 1,2,4,7-tetramethyl-1,4,7-triazacyclononane; 1,2,2,4,7-pentamethyl-1,4,7-triazacyclononane; and 1,4,7-trimethyl-2-benzyl-1,4,7-triazacyclononane; 1,4,7-trimethyl-2-decyl-1,4,7-triazacyclononane and 1,2-bis(4,7-dimethyl-1,4,7-triaza-1-cyclononyl)ethane.

10. Bleach composition according to claim 2, wherein the ligand L is selected from the group consisting of 1,4,7-trimethyl-1,4,7-triazacyclononane and 1,2-bis(4,7-dimethyl-1,4,7-triaza-1-cyclononyl)ethane.

11. Bleach composition comprising:

(a) an effective amount of an enzymatic hydrogen peroxide-generating system to generate hydrogen peroxide;

(b) an effective amount of a bleach catalyst sufficient to interact with the hydrogen peroxide and which is a coordination complex comprising ions selected from the group consisting of manganese and iron complexed with a ligand L which is a macrocyclic organic compound of formula (I):

$$[NR^3-(CR^1(R^2)_u)_t]_s \quad (I)$$

wherein t is an integer from 2 to 3; s is an integer from 3 to 4; u is zero or one; each $R^1$, $R^2$ and $R^3$ are independently selected from the group consisting of H, alkyl, aryl, substituted alkyl and substituted aryl; and (c) an effective amount of an enzymatic aldehyde decomposing system which comprises intact yeast cells of *Saccharomyces cerevisiae* to remove any unpleasant aldehyde smell.

* * * * *